(12) United States Patent
Savaria

(10) Patent No.: US 7,059,455 B2
(45) Date of Patent: Jun. 13, 2006

(54) BRAKE ACTUATOR FOR A TOWED VEHICLE

(76) Inventor: Pierre Savaria, 89 31st avenue, Ste-Marthe, QC (CA) J0N 1P0

( * ) Notice: Subject to any disclaimer, the term of this patent is extended or adjusted under 35 U.S.C. 154(b) by 0 days.

(21) Appl. No.: 11/100,017

(22) Filed: Apr. 6, 2005

(65) Prior Publication Data

US 2005/0218714 A1  Oct. 6, 2005

Related U.S. Application Data

(60) Provisional application No. 60/559,446, filed on Apr. 6, 2004.

(51) Int. Cl.
*B60T 7/20* (2006.01)
(52) U.S. Cl. .................... 188/112 R; 188/3 R
(58) Field of Classification Search ............ 188/3 H, 188/3 R, 112 R; 280/426–487; 303/7, 15
See application file for complete search history.

(56) References Cited

U.S. PATENT DOCUMENTS

| 2,000,999 A | | 5/1935 | Suchland | |
|---|---|---|---|---|
| 2,070,884 A | | 2/1937 | Claus | |
| 2,129,728 A | | 9/1938 | Berg | |
| 2,522,855 A | * | 9/1950 | Brown | 188/112 R |
| 3,007,552 A | | 11/1961 | Eksergian | |
| 3,204,725 A | | 9/1965 | McGraw | |
| 3,318,422 A | | 5/1967 | Frescura | |
| 3,870,128 A | | 3/1975 | Nicolay et al. | |
| 3,892,296 A | | 7/1975 | DePuydt et al. | |
| 4,066,996 A | | 1/1978 | Davis | |
| 5,195,768 A | * | 3/1993 | Hendrix | 280/428 |
| 5,415,424 A | | 5/1995 | Dolan | |
| 5,431,253 A | | 7/1995 | Hargrove | |
| 5,551,539 A | | 9/1996 | Frymiare | |
| 6,079,792 A | | 6/2000 | Kessler | |
| 6,264,228 B1 | | 7/2001 | Westervelt | |
| 6,446,998 B1 | * | 9/2002 | Koenig et al. | 280/432 |
| 6,609,766 B1 | | 8/2003 | Chesnut | |
| 6,626,504 B1 | | 9/2003 | Harner et al. | |

* cited by examiner

*Primary Examiner*—Chris Schwartz

(57) ABSTRACT

A brake actuator is mounted on a towed vehicle. The towed vehicle's own brake pedal actuates the brakes of the towed vehicle and the brake pedal is actuated by a cable mechanically and releasably attached to the brake pedal. The cable is itself fixedly attached to a cable attachment means which is part of a body. In turn, the body is connected to the towing vehicle through a towing implement in the form of a tow bar. When the towing vehicle decelerates, the inertia of the towed vehicle causes the mounting bars to apply pressure against a lower part of the body, this is countered by the tow bar, connected on an upper part of the body, which has for effect to make the body rotate around its axis which is situated in a middle part of the body. This results in the lower part being moved forward which pulls on the cable, which in turn pulls on the brake pedal.

8 Claims, 5 Drawing Sheets

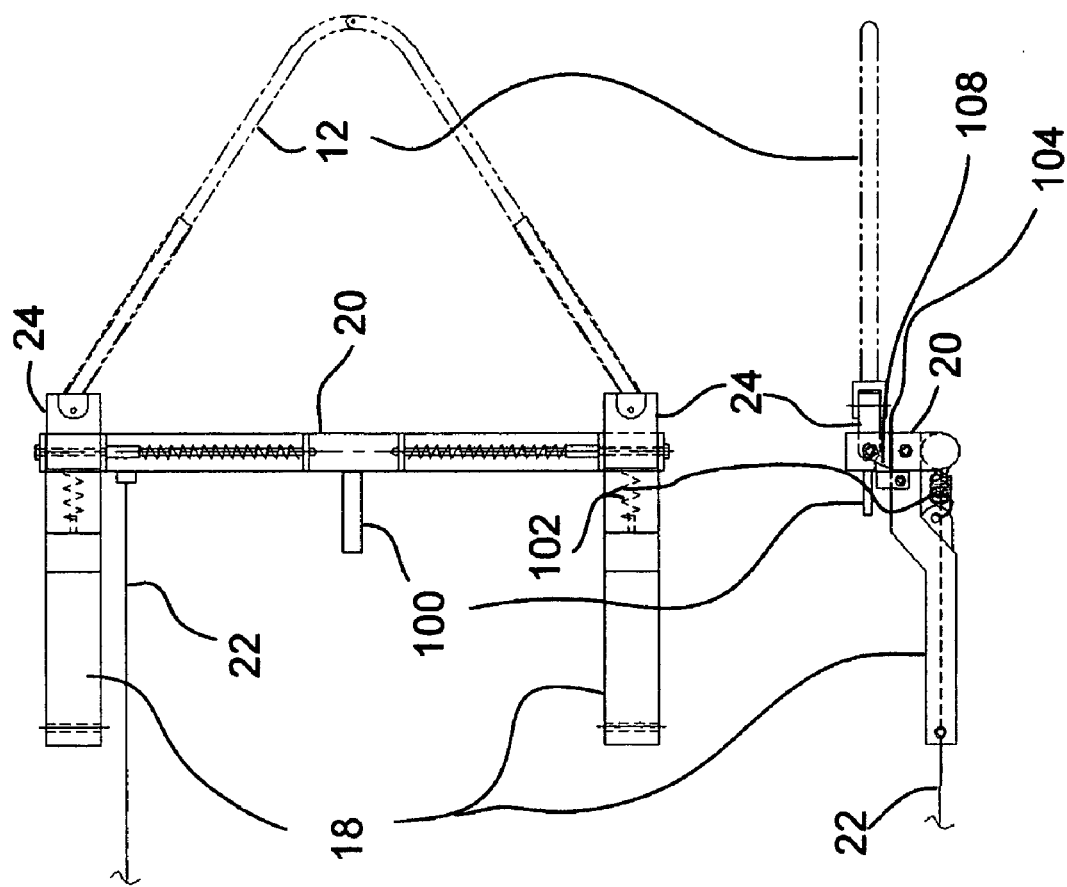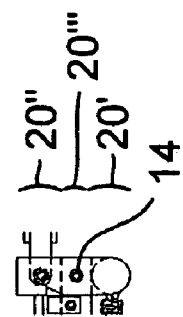

BRAKE ACTUATOR FOR A TOWED VEHICLE

This application claims priority based on provisional application 60/559,446 filed Apr. 6, 2004.

FIELD OF THE INVENTION

The present invention relates to brake actuators. More specifically, the present invention is concerned with a brake actuator for a towed vehicle.

BACKGROUND OF THE INVENTION

Owners of recreational vehicles such as motor homes often tow a smaller vehicle, such as a car, for use once they have reached their destination. It is highly desirable to actuate the brakes of the towed vehicle when the towing vehicle slows down. If the brakes of the towed vehicle are not actuated there is a potential for damage to the towing vehicle or at least, the ability to control the towing vehicle.

Many devices have been conceived to actuate the brakes of the towed vehicle when the towing vehicle slows down or stops. Examples of such devices can be found in U.S. Pat. Nos. 6,626,504, 6,609,766, and 5,431,253.

In U.S. Pat. No. 5,431,253, the brakes of the towed vehicle are actuated by a vacuum captured on the brake system of the towing vehicle.

U.S. Pat. No. 6,626,504 describes a brake actuation system for a towed vehicle wherein a cable pulls the brake pedal of the towed vehicle when the towing vehicle slows down. The cable is actuated by a motor controlled by a controller. The motor pulls the cable when an inertia sensor indicates that the towing vehicle is slowing down.

U.S. Pat. No. 6,609,766 describes yet another brake system for a towed vehicle. In the system of this patent, an actuator activates the brakes of the towed vehicle under the influence of an electric signal coming from the towing vehicle.

The above-described systems are relatively complex and are therefore prone to failure. Also, in each case there is a need to ensure that an electrical or a vacuum connection between the towed vehicle and the towing vehicle is securely provided. Therefore, attaching and releasing the towed vehicle from the towing vehicle is an elaborate procedure.

SUMMARY OF THE INVENTION

In view of the foregoing disadvantages inherent in the known devices now present in the prior art, the present invention, which will be described subsequently in greater detail, is to provide an improved brake actuator for a towed vehicle.

More specifically, in accordance with the present invention, there is provided a brake actuator for a towed vehicle having a brake pedal. The brake actuator is mounted on a towed vehicle. The towed vehicle's own brake pedal actuates the brakes of the towed vehicle and the brake pedal is actuated by a cable mechanically and releasably attached to the brake pedal. The cable is itself fixedly attached to a cable attachment means which is part of a body. In turn, the body is connected to the towing vehicle through a towing implement in the form of a tow bar.

When the towing vehicle decelerates, the inertia of the towed vehicle causes the mounting bars to apply pressure against a lower part of the body, this is countered by the tow bar, connected on an upper part of the body, which has for effect to make the body rotate around its axis which is situated in a middle part of the body. This results in the lower part being moved forward which pulls on the cable, which in turn pulls on the brake pedal.

Advantageously, the brake actuator is simple and requires little or no maintenance. Also, since the brake actuator includes a mechanical system, failures due to leaks or electrical problems are unlikely.

In addition, the brake actuator can be easily be attached, or detached to the towing implement.

The brakes of the towed vehicle are applied automatically each time that the towed vehicle and the towing vehicle approach each other, such as when the towing vehicle slows down or stops.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

FIGS. 4ab top and side views, respectively, of the brake actuator.

FIG. 4c side detail view of the body.

DETAILED DESCRIPTION

Figure 1:
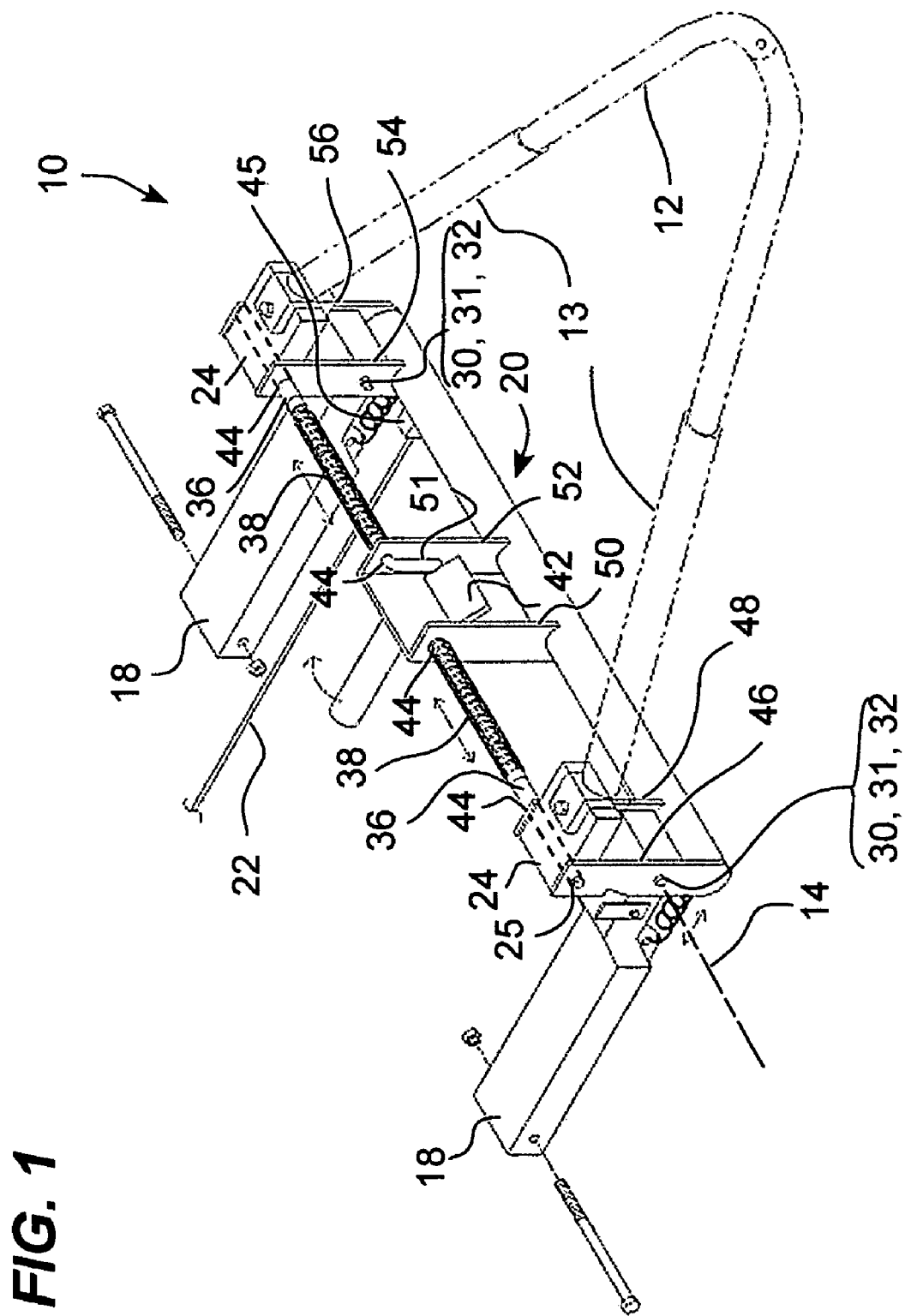
FIG. 1 isometric view of the brake actuator.
Figure 2:
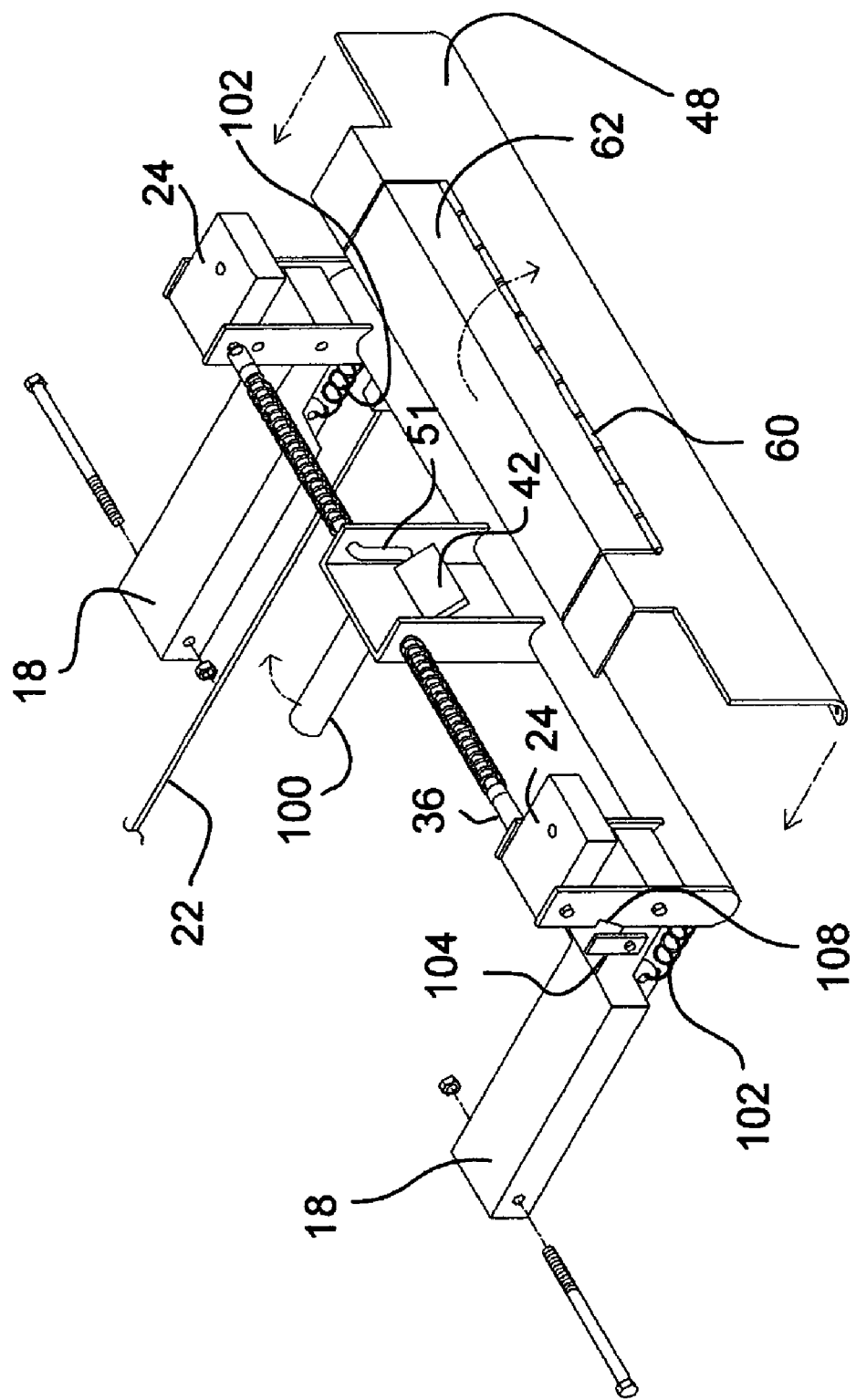
FIG. 2 isometric view of the brake actuator of FIG. 1 without the tow bar and with the cover about to be installed.
Figure 3:
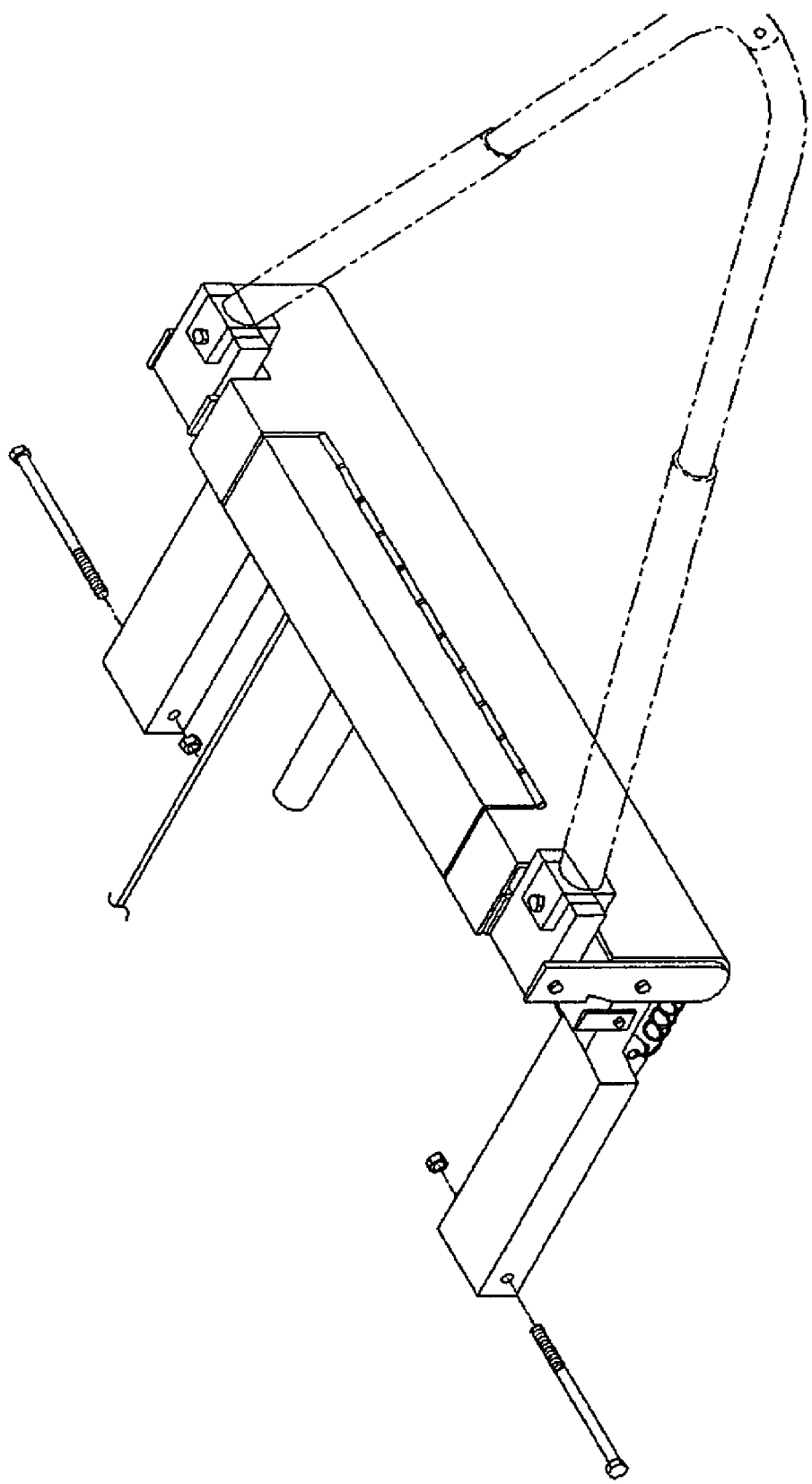
FIG. 3 isometric view of the brake actuator of FIG. 1 with the cover installed
Figure 5:
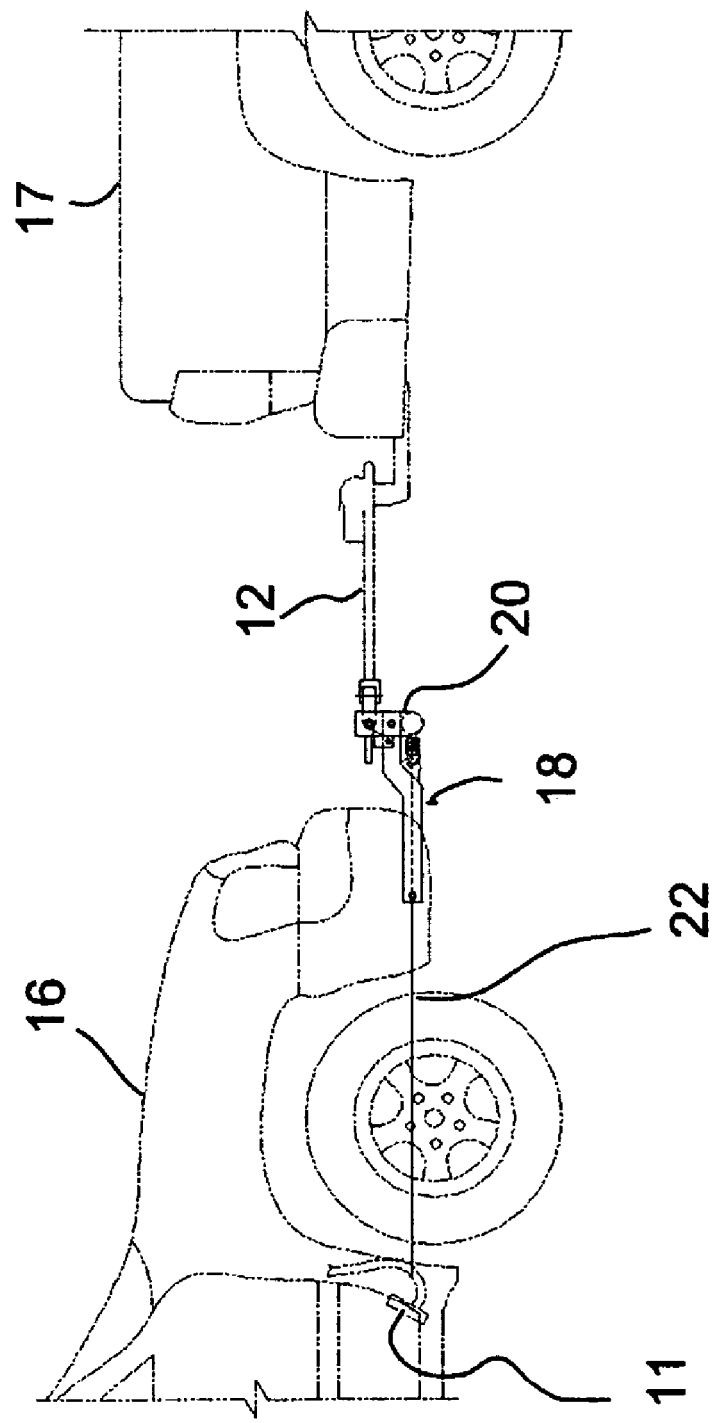
FIG. 5 side view of the brake actuator with the towed vehicle.

A brake actuator 10 is mounted on a towed vehicle 16. The towed vehicle's 10 own brake pedal 11 actuates the brakes of the towed vehicle 16 and the brake pedal 11 is actuated by a cable 22 mechanically and releasably attached to the brake pedal 11. The cable 22 is itself fixedly attached to a cable attachment means 45 which is part of a body 20. In turn, the body 20 is connected to the towing vehicle through a towing implement in the form of a tow bar 12. The cable 22 is any suitable cable, such as, for example, a metal cable contained at least in part within a sheath.

The brake actuator 10 includes an attachment portion in the form of mounting bars 18 mounted on the towed vehicle 16.

When the towing vehicle 17 decelerates, the inertia of the towed vehicle 16 causes the mounting bars 18 to apply pressure against a lower part 20' of the body 20, this is countered by the tow bar 12, connected on an upper part 20'' of the body 20, which has for effect to make the body 20 rotate around its axis 14 which is situated in a middle part 20''' of the body 20. This results in the lower part 20' being moved forward which pulls on the cable 22, which in turn pulls on the brake pedal 11.

The tow bar 12 connects to the body 20 by way of attachment clips 24. Each attachment clip 24 is pivotally mounted on a respective bar 13 of the tow bar 12, and each attachment clip 24 includes an attachment hole 25 extending therethrough. The attachment hole 25 is engaged by an attachment means of the body 20, which will be described in further detail hereinbelow.

The mounting bars 18 are attached to the towed vehicle 16 through any of a variety of suitable means well known in the art, such as soldering, rivets or as per FIG. 1, bolts. Each of the mounting bars 18 includes a bar mounting hole 30 extending therethrough at one extremity. The bar mounting holes 30 are used to pivotally mount the body 20 on the mounting bars 18.

Body mounting holes 32 are provided such that the body 20 can be pivotably mounted on the mounting bars 18 through nuts and bolts means 31 inserted through the bar mounting holes 30 and the body mounting holes 32. The body mounting holes define the axis 14.

In order to release the tow bar 12 from the body 20, rods 36 are slidably engaging the attachment clips 24 through their attachment hole 25. The rods 36 pass through a plurality of holes 44 provided in six panels 46, 48, 50, 52, 54 and 56. A biasing means 38 is provided for each rod 36 between panels 48 and 50 and panels 52 and 54.

A blocker 42 is provided between the panels 50 and 52 and is configured such that the rods 36 are normally locked in place when tip 51 of each rod 36 is down but are free to be pulled when the tip 51 is lifted. Pulling on the rods 36 will disengage them from the attachment holes 25 which results in the separation of the tow bar 12 from the body 20. The reverse process will engage the tow bar 12 onto the body 20.

A cover 48 shields the rods 36 and includes a lid 62 hingedly attached to the cover 48 by way of a hinge 60. The hinge 60 is a biased hinge wherein the lid 62 is pushed toward the body 20. Alternatively, the hinge 60 is a regular hinge, which is not biased. The body 58 includes any suitable material, such as sheet metal or plastic. In some embodiments of the invention, the cover 48 is removably attached to the body 20. Alternatively, the cover 48 is permanently attached to the body 20.

In some embodiments of the invention, the cover 48 is attached to the body 20 through screws, or it is configured such that the cover 48 snaps to the body 20 under an elastic deformation. However, any other suitable attachment method can be used to attach the cover 48 to the body 20 without departing from the scope of the invention. The lid 62 allows access to the tips 51. when the cover 48 is attached to the body 20.

A biasing element 102 is attached to at least one of the mounting bars 18 and to the body 20. The biasing element 102 pivotably biases the body 20 towards a neutral position wherein the brake pedal 11 is not depressed. Examples of suitable biasing element include a spring and an air shock.

A lever 100 extending from the body 20 allows a user to manually pivot the body 20 with respect to the mounting bars 18. The lever 100 is so positioned as to be accessible when in use, while staying unobtrusive when not in use.

The lock 104 takes the form of a block pivotably mounted to at least one of the attachment bars 18 and provided for engaging a notch 108 in the body 20. The lock 104 prevents a rotation of the body 20 in a direction wherein the brake pedal 11 is depressed. One use of the lock 104 is to prevent the brakes of the towed vehicle 16 to be applied when the towing vehicle backs up.

The body 20 and the mounting bars 18 are typically left semi-permanently attached to the towed vehicle 16.

While the brake actuator 10 illustrated in the drawings is substantially horizontal, it is also within the scope of the invention to have a similar brake actuator which is substantially vertical.

In addition, the ways in which the body 20 is connected to the mounting system 18 and the tow bars 12 are attached to the body 20 are given only as an example. The reader skilled in the art will readily appreciate that these attachments could be performed in many alternative suitable ways.

All of the above-described components include metallic and/or polymer parts. In addition, some or all metallic parts, and eventually plastic parts, are painted in some embodiments of the invention.

While the brake actuator 10 pulls the cable 22 through a pivoting motion of the body 20 with respect to the mounting system 18, it is within the scope of the invention to have a brake actuator pulling a cable attached to a brake pedal wherein the cable is moved through a translation of a body.

The exact shape of the body 20 is not critical to the invention. Therefore, many alternative suitable bodies are conceivable by a reader skilled in the art.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A brake actuator for a towed vehicle using said towed vehicle's own brake pedal to actuate the brakes of said towed vehicle, said brake actuator being attachable to a towing vehicle by way or a tow bar, said brake actuator comprising;
    a body, mounting bars and a cable;
    said mounting bars being fixedly attached, on one part, to a towed vehicle;
    said mounting bars, on another part, having bar mounting holes so that said body can be pivotably mounted on said mounting bars through nuts and bolts means inserted through bar mounting holes and body mounting holes;
    said body mounting holes defining an axis;
    said body being releasably attached to said tow bar by way of attachment clips wherein each said attachment clip is pivotally mounted on a bar of said tow bar and an attachment hole is engaged by an attachment means to said body;
    rods passing through a plurality of holes made through a plurality of panels;
    said rods slidably engaging said attachment clips through attachment holes;
    said rods having a biasing means;
    a blocker configured such that said rods being normally locked in place when a tip extending off each said rod is locked by said blocker but are free to be pulled when said tip is no longer blocked by said blocker.

2. A brake actuator for a towed vehicle as in claim 1 wherein:
    a cover to shield said rods has a lid hingedly attached to said cover by way of a hinge.

3. A brake actuator for a towed vehicle as in claim 2 wherein:
    said hinge being a biased hinge wherein said lid is pushed toward said body.

4. A brake actuator for a towed vehicle as in claim 2 wherein:
    said cover being permanently attached to said body.

5. A brake actuator for a towed vehicle as in claim 2 wherein:
    said cover being removably attached to said body.

6. A brake actuator for a towed vehicle as in claim 2 wherein:
    said cover snapping to said body under an elastic deformation.

7. A brake actuator for a towed vehicle as in claim 1 wherein:
    a biasing element is attached to at least one of said mounting bars and to said body;
    said biasing element pivotably biasing said body towards a neutral position wherein said brake pedal is not depressed;
    said lock pivotably mounted to at least one of said attachment bars and provided for engaging a notch in said body.

8. A brake actuator for a towed vehicle as in claim 1 wherein:
    a lever allows a user to manually pivot said body with respect to said mounting bars.

* * * * *